US012704450B2

(12) United States Patent
Wang et al.

(10) Patent No.: US 12,704,450 B2
(45) Date of Patent: Aug. 11, 2026

(54) DUST DETECTION METHOD BASED ON IMAGE PROCESSING AND RELATED EQUIPMENT THEREOF

(71) Applicant: Hunan University of Science & Technology, Xiangtan (CN)

(72) Inventors: Pengfei Wang, Xiangtan (CN); Mengsen Zhao, Xiangtan (CN); Yongjun Li, Xiangtan (CN); Yong Chen, Xiangtan (CN); Shilin Li, Xiangtan (CN)

(73) Assignee: HUNAN UNIVERSITY OF SCIENCE & TECHNOLOGY, Xiangtan (CN)

( * ) Notice: Subject to any disclaimer, the term of this patent is extended or adjusted under 35 U.S.C. 154(b) by 0 days.

(21) Appl. No.: 19/296,146

(22) Filed: Aug. 11, 2025

(65) Prior Publication Data

US 2025/0362217 A1 Nov. 27, 2025

(30) Foreign Application Priority Data

Nov. 1, 2024 (CN) ........................ 202411549926.6

(51) Int. Cl.
*G01N 15/075* (2024.01)
*G06T 7/40* (2017.01)
*G01N 15/00* (2006.01)

(52) U.S. Cl.
CPC ............. *G01N 15/075* (2024.01); *G06T 7/40* (2013.01); *G01N 2015/0046* (2013.01); *G06T 2207/10016* (2013.01); *G06T 2207/20081* (2013.01)

(58) Field of Classification Search
CPC .......... G01N 15/075; G01N 2015/0046; G06T 7/40; G06T 2207/10016; G06T 2207/20081
(Continued)

(56) References Cited

U.S. PATENT DOCUMENTS 6,144,755 A * 11/2000 Niyogi .................. G06V 20/59 382/226
6,724,938 B1 * 4/2004 Matsumura .............. G06T 7/12 382/199
(Continued)

FOREIGN PATENT DOCUMENTS

CN 102420930 A 4/2012
CN 110012182 A 7/2019
CN 110402577 A 11/2019

*Primary Examiner* — Matthew David Kim
(74) *Attorney, Agent, or Firm* — HOWARD M COHN and Associates, LLC

(57) ABSTRACT

The embodiment of the present invention provides a dust detection method and apparatus based on image processing. The method comprises: obtaining dust data in a current area, wherein the dust data comprises dust image data and dust concentration data; processing the dust image data and the dust concentration data through a trained dust feature analysis model to obtain dust feature data in the current area; and integrating and outputting the dust feature data through a visualization module to generate a visualized dust feature report. Through the method described above, a solution that combines image data and concentration data to obtain accurate dust feature data is implemented. By comprehensively analyzing current dust concentration and images within a certain area, the real-time performance, accuracy, and stability of dust detection in the area are improved.

9 Claims, 3 Drawing Sheets

(58) Field of Classification Search
USPC .......................................................... 348/143
See application file for complete search history.

(56) References Cited

U.S. PATENT DOCUMENTS

| | | | | |
|---|---|---|---|---|
| 11,698,331 | B1* | 7/2023 | Manautou | G01N 21/84 356/341 |
| 12,112,435 | B1* | 10/2024 | Bhushan | H04N 7/157 |
| 2010/0253806 | A1* | 10/2010 | Guan | G06V 40/171 348/E5.031 |
| 2016/0307025 | A1* | 10/2016 | Lee | G06V 40/12 |
| 2019/0180135 | A1* | 6/2019 | Cobb | G06V 10/40 |
| 2019/0195142 | A1* | 6/2019 | Vierling | F23D 11/44 |
| 2019/0346356 | A1* | 11/2019 | Karnik | G01N 1/2205 |
| 2020/0219306 | A1* | 7/2020 | Morgan | G06T 15/60 |
| 2020/0234072 | A1* | 7/2020 | Rao | G06V 30/2504 |
| 2020/0258242 | A1* | 8/2020 | Liu | G06T 7/70 |
| 2021/0241470 | A1* | 8/2021 | Tang | G06V 10/443 |
| 2023/0039403 | A1* | 2/2023 | De Santo | B64U 10/13 |
| 2023/0334651 | A1* | 10/2023 | George | G06T 7/0004 |
| 2023/0385875 | A1* | 11/2023 | Nigul | G06Q 30/0242 |
| 2024/0121511 | A1* | 4/2024 | Xu | H04N 23/958 |
| 2024/0296652 | A1* | 9/2024 | Wang | G06V 10/25 |
| 2025/0209584 | A1* | 6/2025 | Kang | G06T 7/0002 |

* cited by examiner

DUST DETECTION METHOD BASED ON IMAGE PROCESSING AND RELATED EQUIPMENT THEREOF

CROSS-REFERENCE TO RELATED APPLICATIONS

The application claims priority to Chinese patent application No. 202411549926.6, filed on Nov. 1, 2024, the entire contents of which are incorporated herein by reference.

TECHNICAL FIELD

The present invention relates to the field of environmental detection, and particularly relates to a dust detection method and apparatus based on image processing, an electronic device, and a storage medium thereof.

BACKGROUND

In the fields of environmental monitoring and air quality assessment, detection and analysis of dust are critical links. Dust not only affects air quality but may also have significant impacts on human health and industrial production environments. Therefore, accurate monitoring and assessment of dust content in the air have become important tasks in environmental protection and health supervision.

Current dust detection methods are unable to determine the current status of dust by combining image data with corresponding dust concentration data, thus leading to problems of low detection accuracy and poor stability in dust detection.

SUMMARY

The embodiment of the present invention provides a dust detection method based on image processing, to solve the problems that the existing dust detection method is unable to determine the current status of dust by combining image data and concentration data corresponding to the dust, thereby resulting in low detection accuracy and poor stability in dust detection.

In a first aspect, an embodiment of the present invention provides a dust detection method based on image processing, and the method comprises the following steps:

obtaining dust data in a current area, wherein the dust data comprises dust image data and dust concentration data;

processing the dust image data and the dust concentration data through a trained dust feature analysis model to obtain dust feature data in the current area;

integrating and outputting the dust feature data through a visualization module to generate a visualized dust feature report.

Optionally, the obtaining of the dust data in the current area comprises:

collecting dust in the current area over a preset time period through a preset concentration sensor to obtain corresponding dust concentration data.

Capturing images of dust in the current area over a preset time period through a preset optical camera to obtain corresponding dust image data.

Optionally, the capturing of images of dust in the current area over a preset time period through the preset optical camera to obtain corresponding dust image data comprises:

performing image enhancement preprocessing on first image data obtained from the capturing to obtain second image data;

performing feature marking preprocessing on the second image data to obtain the corresponding dust image data, wherein the dust image data comprises corresponding dust features.

Optionally, the processing of the dust image data and the dust concentration data through the trained dust feature analysis model to obtain dust feature data in the current area comprises:

performing similarity calculation between dust features corresponding to the dust image data and the dust concentration data to determine an overlapping portion between the dust image data and the dust concentration data;

determining dust feature data in the current area based on the overlapping portion, wherein the dust feature data comprises a current concentration, a concentration trend, and a corresponding early warning scheme.

Based on the above technical solution, the above settings are convenient for the users to quickly install the cleaning tool head to the connecting frame or remove it from the connecting frame, and the two connecting portions are inserted into the two slots through the bolts respectively, so that the cleaning tool head is more stably connected with the car body.

Optionally, before the processing of the dust image data and the dust concentration data through the trained dust feature analysis model to obtain dust feature data in the current area, the method further comprises:

obtaining a dust feature analysis model to be trained and a training dust sample set, wherein the training dust sample set comprises dust concentration, dust images corresponding to the dust concentration, and dust concentration labels corresponding to the dust images;

performing iterative training on the dust feature analysis model to be trained based on the dust concentration, the dust images corresponding to the dust concentration, and the dust concentration labels corresponding to the dust images, and obtaining a trained dust feature analysis model after completion of iterative training.

Optionally, the performing iterative training on the dust feature analysis model to be trained based on the dust concentration, the dust images corresponding to the dust concentration, and the dust concentration labels corresponding to the dust images, and obtaining a trained dust feature analysis model after completion of iterative training, further comprises:

taking dust images corresponding to the latest obtained dust concentration as latest training samples to replace a current training set;

performing iterative training on the dust feature analysis model to be trained through the latest training samples, and obtaining the trained dust feature analysis model.

Optionally, the integrating and outputting of the dust feature data through the visualization module to generate the visualized dust feature report comprises:

determining a curve graph of each feature data in hierarchical feature data based on the dust feature data;

obtaining a trend graph of each feature data based on the curve graph;

generating a corresponding early warning strategy according to the trend graph and the curve graph, and generating a visualization report for displaying.

In a second aspect, the embodiment of the present invention further provides a dust detection apparatus based on image processing, wherein the dust detection apparatus based on image processing comprises:

- an obtaining module, configured to acquire dust data in a current area, wherein the dust data comprises dust image data and dust concentration data;
- a processing module, configured to process the dust image data and the dust concentration data through a trained dust feature analysis model, so as to obtain dust feature data in the current area; and
- a generating module, configured to integrate and output the dust feature data through the visualization module, so as to generate a visualized dust feature report.

In a third aspect, an embodiment of the present invention provides an electronic device, comprising: a memory, a processor, and a computer program stored in the memory and executable by the processor, wherein the processor implements the steps in the dust detection method based on image processing provided in the embodiment of the present invention when executing the computer program.

In a fourth aspect, an embodiment of the present invention provides a computer-readable storage medium having stored thereon a computer program, wherein the computer program implements the steps in the dust detection method based on image processing provided in the embodiment of the present invention when executed by a processor.

In the embodiment of the present invention, dust data in a current area is obtained, wherein the dust data comprises dust image data and dust concentration data; the dust image data and the dust concentration data are processed through a trained dust feature analysis model, so as to obtain dust feature data in the current area; the dust feature data is integrated and output through a visualization module, so as to generate a visualized dust feature report. Through the above method, a scheme of combining image data with concentration data to obtain accurate dust feature data is achieved. Through comprehensive analysis of current dust concentration and images in a certain area, the real-time performance, accuracy, and stability of dust detection in the area are improved.

BRIEF DESCRIPTION OF THE DRAWINGS

In order to illustrate the technical solutions in the embodiments of the present invention more clearly, the drawings required in the description of the embodiments will be briefly introduced below. It should be understood that the drawings described in the following are merely some embodiments of the present invention, and therefore should not be regarded as limitations of the scope. For those skilled in the art, other drawings can also be obtained according to the drawing without making any creative efforts.

DETAILED DESCRIPTION OF EMBODIMENTS

The technical solutions in the embodiments of the present invention will be illustrated in detail in combination with the embodiments and the drawings. It should be understood that the specific embodiments described here are only used to explain the present invention and are not used to limit the present invention. Based on the embodiments of the present invention, all other embodiments obtained by a person skilled in the art without making creative efforts shall fall within the scope of the present invention.

The terms “first”, “second”, etc. in the specification and claims of the present application are used to distinguish between similar objects, rather than to describe a particular order or sequence. It should be understood that the data used in this manner may be interchanged when appropriate, such that the embodiments of the present application can be implemented in orders other than those illustrated or described herein, and the objects distinguished by “first”, “second”, etc. generally belong to a category, without limiting the number of objects; for example, the first object can be one or multiple objects. Furthermore, the term “and/or” in the specification and claims indicates at least one of the connected objects, and the character “/” generally indicates an “or” relationship between associated objects before and after it.

Figure 1:
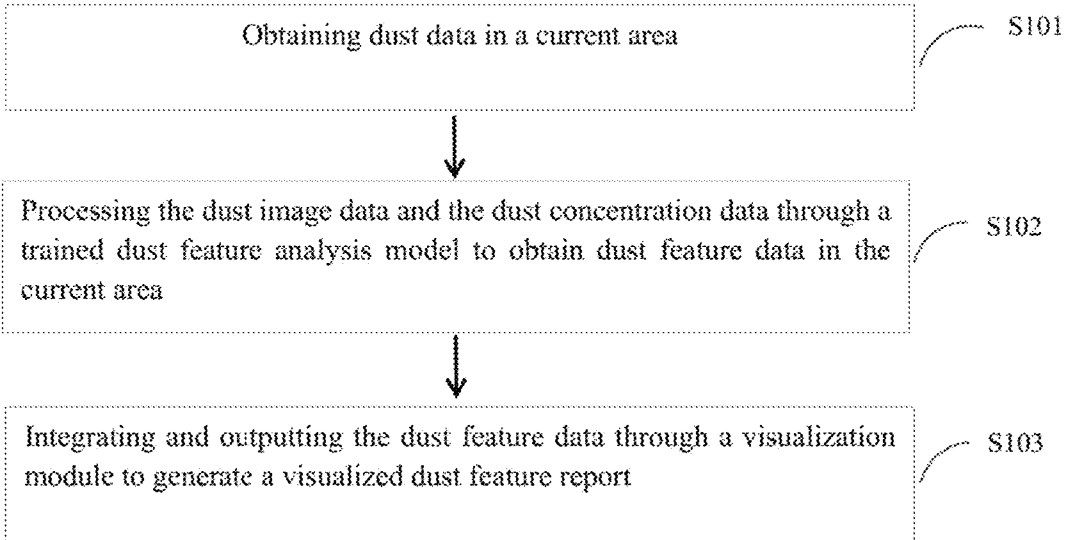
FIG. 1 is a flowchart of a dust detection method based on image processing provided by an embodiment of the present invention.

As shown in FIG. 1, FIG. 1 is a flowchart of a dust detection method based on image processing provided by an embodiment of the present invention. The dust detection method based on image processing comprises steps:

S101, obtaining dust data in a current area.

In the embodiment of the present invention, the dust detection method based on image processing may be applied to a dust detection apparatus based on image processing. The dust detection apparatus based on image processing has functions of dust data processing, dust data sending and receiving, and dust data storage, and may be constructed based on a server or server cluster. The server or server cluster described above may be an electronic device with dust data processing capability.

The dust data described above may include, but not limited to, dust image data and dust concentration data. Specifically, the dust image data described above may be obtained by real-time capturing of dust portions in the current area through a high-resolution camera. Generally, the area described above may be determined according to a maximum dust capture capability of the camera, wherein the maximum dust capture capability can be determined according to the clarity of the dust images captured within the maximum area, namely, the clearer the captured dust images within a larger area, the stronger the maximum dust capture capability.

It should be noted that the high-resolution camera described above is further provided with a set of lighting system. The lighting system adopts a light source with wavelength and intensity matching ambient light under the current environment, so that the camera can clearly capture dust particle images in the air under various ambient lighting conditions.

The dust concentration data described above may be specific values obtained by obtaining and calculating dust particle quantity in a certain area through a preset concentration sensor. The dust concentration data may indicate a distribution degree of dust particles in the current area.

S102, processing the dust image data and the dust concentration data through a trained dust feature analysis model to obtain dust feature data in the current area.

In the embodiment of the present invention, the trained dust feature analysis model described above may include, but is not limited to, any deep learning model capable of performing comprehensive analysis on dust image data and dust concentration data and outputting dust feature data of the current area, such as BERT (Bidirectional Encoder Representations from Transformers), CLIP (Contrastive Language-Image Pre-training), MMBT (Multimodal Bitransformer), or other deep learning models.

The dust feature data described above may be comprehensive information obtained by processing dust image data and dust concentration data through the trained dust feature analysis model. The dust feature data can be used to describe detailed characteristics of dust, including but not limited to particle size, shape, distribution, and other characteristics related to the concentration in the current environment.

In one possible embodiment, the dust image data and the dust concentration data described above are inputted into the trained dust feature analysis model. The model calculates and outputs precise dust feature data by analyzing particle size, shape, and distribution of dust particles in the images combined with dust concentration data. It can be understood that the outputted data may include, but not limited to, dust concentration, distribution trends, and potential risk levels. These data are integrated by a visualization module to generate an easy-to-understand dust feature report, providing a basis for environmental monitoring and health risk assessment.

S103, integrating and outputting the dust feature data through the visualization module to generate a visualized dust feature report.

In the embodiment of the present invention, the visualization module described above may display the output dust feature data on a smart terminal for inspection by a user, and may generate a feature report integrating corresponding data.

In one possible embodiment, the dust concentration, form, distribution, and trend data are converted into intuitive graphics and charts through the visualization module described above, and dust conditions within the area are displayed in real time through the smart terminal. It can be understood that early-warning and protective measures corresponding to the dust conditions may also be generated, enabling the user to rapidly understand the current air quality status and respond accordingly.

In the embodiment of the present invention, dust data in a current area is obtained, wherein the dust data comprises dust image data and dust concentration data; the dust image data and the dust concentration data are processed through a trained dust feature analysis model to obtain dust feature data in the current area; and the dust feature data is integrated and output through a visualization module to generate a visualized dust feature report. Through the above method, a scheme combining image data and concentration data to obtain accurate dust feature data is implemented. By comprehensively analyzing current dust concentration and images in a certain area, the real-time performance, accuracy, and stability of dust detection in the area are improved.

Optionally, the obtaining of dust data in the current area further comprises: collecting dust in the current area over a preset time period through a preset concentration sensor to obtain corresponding dust concentration data; and capturing images of dust in the current area over a preset time period through a preset optical camera to obtain corresponding dust image data.

In the embodiment of the present invention, the preset concentration sensor described above may include, but is not limited to, any sensor capable of setting an area range and collecting dust within the area range. Specifically, after collecting dust in the current area, the preset concentration sensor calculates dust concentration data of the current area according to the set area range and the number of collected dust particles.

The preset optical camera described above may be a high-resolution camera device specifically used for capturing images of airborne dust particles in real time. The camera's position, capturing frequency, and image quality can be determined based on the maximum dust capturing capability described above, thus ensuring clear dust image data can be stably captured under various lighting and environmental conditions. Generally, the preset optical camera described above is also provided with appropriate optical filters and fill lights to reduce ambient light interference, enhance the capturing effect, and facilitate recognition and processing of dust particles by subsequent image processing and analysis algorithms.

Optionally, the capturing of images of dust in the current area over a preset time period through the preset optical camera to obtain corresponding dust image data further comprises: performing image enhancement preprocessing on first image data obtained from the capturing to obtain second image data; and performing feature marking preprocessing on the second image data to obtain corresponding dust image data, wherein the dust image data comprises corresponding dust features.

In the embodiment of the present invention, the image enhancement preprocessing described above may include, but is not limited to, operations such as denoising, contrast enhancement, and edge detection. Specifically, a filtering algorithm (e.g., Gaussian filtering) may be employed to remove noise in images, histogram equalization may be applied to enhance image contrast, and a Canny edge detection algorithm may be adopted to extract edge information of dust particles in images.

More specifically, the denoising described above may utilize filters (such as Gaussian filter, median filter, etc.) to perform denoising processing on images, thereby reducing the impact of image noise on subsequent processing. The image enhancement described above may enhance the contrast and clarity of images using histogram equalization and contrast enhancement techniques, so as to better observe and analyze dust particles in images. The edge detection described above may use edge detection algorithms (such as Sobel, Canny, etc.) to detect edge information in images, thereby locating and extracting contours and shape features of dust particles.

The feature marking preprocessing described above may extract feature information such as shape, size, and distribution of dust particles through morphological processing and contour extraction techniques, which is used for subsequent dust concentration analysis and recognition.

In addition, segmentation algorithms (such as threshold segmentation and region-growing segmentation) may be applied to separate and segment dust particles from the background in images, facilitating subsequent feature extraction and analysis.

In one possible embodiment, key features such as shape, size, and distribution of dust particles are precisely recognized and extracted from obtained dust images through morphological processing and contour extraction techniques. Segmentation processing, such as threshold segmentation and region-growing algorithms, is further employed to separate dust particles in the images from the background, making features of the dust particles more distinct and easier to analyze.

This processing method significantly improves the usability of data, enabling more accurate and effective analysis and identification of dust concentration.

Optionally, the processing of dust image data and dust concentration data through the trained dust feature analysis model to obtain dust feature data in the current area further comprises: performing similarity calculation between dust features corresponding to the dust image data and the dust concentration data to determine an overlapping portion between the dust image data and the dust concentration data; and determining dust feature data in the current area based on the overlapping portion.

In the embodiment of the present invention, the similarity calculation described above may be performed based on dust concentration data corresponding to the dust features and obtained dust concentration data. Specifically, similarity calculations, such as cosine similarity or correlation coefficients, may be conducted between concentration data obtained by sensors and image features to determine the overlapping portion between the image data and the concentration data.

Through the above method, the actual state of dust can be accurately monitored and analyzed, thereby improving the accuracy and reliability of dust concentration measurement. This data fusion technique not only enhances the validity of monitoring data but also provides a more scientific and real-time basis for dust management, thereby improving overall performance and responsiveness of the environmental monitoring system.

The dust feature data described above may include, but is not limited to, parameters such as current concentration, concentration trend, and corresponding early-warning schemes. Specifically, since different dusts exhibit different morphologies and characteristics within different areas—for instance, calculation methods for concentration may vary due to larger dust particle sizes—different types of dust can therefore be determined according to different detected dust feature data.

In one possible embodiment, by performing similarity calculations between dust features in image data and obtained dust features, an overlapping portion is determined in the image data. Feature extraction is performed on the image data of the overlapping portion to determine dust feature data corresponding to the specific type of dust.

Optionally, before the step of processing dust image data and dust concentration data through the trained dust feature analysis model to obtain dust feature data in the current area, the method further comprises obtaining a dust feature analysis model to be trained and a training dust sample set; and performing iterative training on the dust feature analysis model to be trained based on dust concentration, dust images corresponding to the dust concentration, and dust concentration labels corresponding to the dust images, so as to obtain a trained dust feature analysis model upon completion of iterative training.

In the embodiment of the present invention, the dust feature analysis model to be trained described above may include, but is not limited to, any deep learning model which is not yet capable of comprehensively analyzing and processing dust image data and dust concentration data and outputting dust feature data in the current area, such as BERT (Bidirectional Encoder Representations from Transformers), CLIP (Contrastive Language-Image Pre-training), and MMBT (Multimodal Bitransformer). Specifically, since dust image data of different types of dust share similarities, before the training of the deep learning model is completed, the dust image data and dust concentration data inputted into the dust feature analysis model to be trained might result in dust feature data that deviates from actual results.

The training dust sample set described above may include, but is not limited to, dust concentration, dust images corresponding to the dust concentration, and dust concentration labels corresponding to the dust images.

The dust images corresponding to the dust concentration described above may be collected image information of different types of dust under different concentrations.

The dust concentration labels described above may be accurate concentration data of different types of dust under different image information stored in a database.

In one possible embodiment, iterative training is performed on the dust feature analysis model to be trained based on the dust concentration, the dust images corresponding to the dust concentration, and the dust concentration labels corresponding to the dust images described above. Specifically, the dust concentration and dust images corresponding to the dust concentration described above are inputted into the dust feature analysis model to be trained, and parameters of the model are adjusted with an objective to infinitely approach the dust concentration labels corresponding to the dust images described above, until the similarity between the outputted dust feature data and the dust concentration labels corresponding to the dust images reaches a preset similarity threshold. At this point, the training of the model is completed, and a trained dust feature analysis model is obtained.

Optionally, during the step of performing iterative training on the dust feature analysis model to be trained based on the dust concentration, the dust images corresponding to the dust concentration, and the dust concentration labels corresponding to the dust images, and obtaining a trained dust feature analysis model upon completion of iterative training, the method further comprises: taking newly obtained dust images corresponding to the latest dust concentration as latest training samples to replace a current training set; and performing iterative training on the dust feature analysis model to be trained through the latest training samples, so as to obtain the trained dust feature analysis model.

In the embodiment of the present invention, training threshold detection may be performed on training samples, and whether the current training samples meet the training requirements of the current dust feature analysis model to be trained can be determined according to a preset training threshold.

In one possible embodiment, if the detected error exceeds the preset training threshold or if the coefficient of determination does not reach the threshold, updated training samples and corresponding optimized image preprocessing algorithms, such as denoising, contrast enhancement, and edge detection, are obtained from the database. This ensures that the quality and clarity of input images and corresponding training samples meet clarity and quality requirements. Adaptive filtering algorithms are employed to dynamically adjust preprocessing parameters based on different environmental conditions, thereby improving preprocessing effectiveness. Subsequently, the deep learning model is retrained.

Optionally, during the step of integrating and outputting the dust feature data through the visualization module to generate a visualized dust feature report, the method comprises determining curve graphs of each feature data in hierarchical feature data based on the dust feature data; obtaining trend graphs of each feature data based on the curve graphs; generating corresponding early-warning strategies according to the trend graphs and the curve graphs; and generating a visualization report for display.

In the embodiment of the present invention, dust feature data such as particle size, shape, and concentration are collected and analyzed. After processing by the trained dust feature analysis model, curve graphs of each feature are drawn within hierarchical feature data. These curve graphs are utilized to generate trend graphs for dust features, thereby displaying time-varying dust behaviors and patterns on a smart terminal. Based on these data and graphs, early-warning strategies are automatically formulated. For example, when it is detected that the dust concentration exceeds a safety threshold, management personnel are immediately notified to take action.

Through the method described above, the monitoring team can not only track historical changes in dust levels, but also predict future trends. Furthermore, all data and graphs are presented through an intuitive visualization report, which improves decision-making efficiency and response speed, ensuring environmental safety and protecting personnel health, while enhancing the efficiency of dust detection.

In one possible embodiment, after entering the dust detection system through ID verification, users can manage alarm operations through a computer, setting different alarm thresholds for various detection areas based on specific requirements. Specifically, dynamic adjustment of alarm thresholds can be supported, ensuring the dust detection system can flexibly respond to changes in dust concentration under different environmental conditions.

More specifically, when the dust concentration exceeds a preset threshold, the system sends alarms to users through pop-up windows, sound prompts, red warning indicators, and other methods. Users can click on alarm notifications to view detailed information, such as alarm time, detection area, concentration value, and the like. In addition, users may view all historical alarm records within the alarm history, handle alarms, and add notes (such as handling measures, outcomes, etc.).

In another possible embodiment, parameters of the image processing module (e.g., filter parameters, edge detection parameters, etc.) may also be adjusted by users to optimize image processing effects. Saving and restoring default parameter configurations are supported, facilitating users to quickly adjust settings in different environments.

More specifically, the dust detection system may further provide a management interface for the deep learning model. Users may upload, update, and switch model files, and view detailed model information (such as training parameters, version numbers, etc.).

Figure 2:
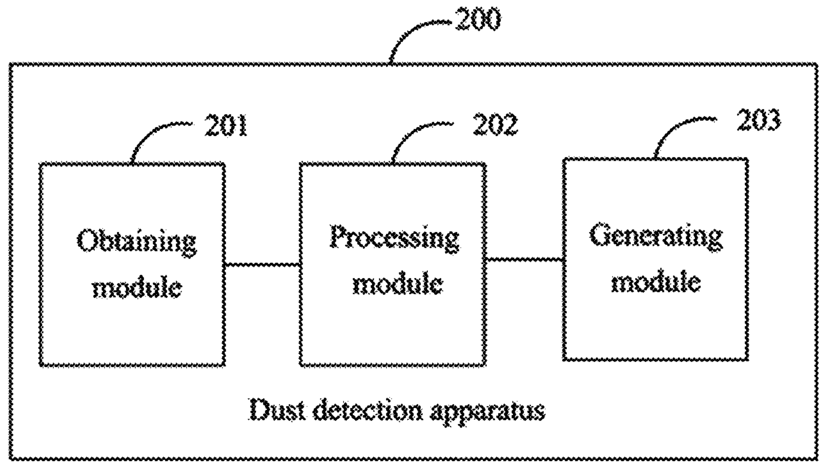
FIG. 2 is a schematic structural diagram of a dust detection apparatus based on image processing provided in an embodiment of the present invention.

As shown in FIG. 2, the embodiment of the present invention further provides a dust detection apparatus 200 based on image processing, wherein the dust detection apparatus based on image processing comprises:

an obtaining module 201, configured to acquire dust data in a current area, wherein the dust data comprises dust image data and dust concentration data;

a processing module 202, configured to process the dust image data and the dust concentration data through a trained dust feature analysis model to obtain dust feature data in the current area; and a generating module 203, configured to integrate and output the dust feature data through a visualization module to generate a visualized dust feature report.

Optionally, the obtaining module 201 comprises:

a first obtaining sub-module, configured to collect dust in the current area over a preset time period through a preset concentration sensor to obtain corresponding dust concentration data;

a second obtaining sub-module, configured to capture images of dust in the current area over a preset time period through a preset optical camera to obtain corresponding dust image data.

Optionally, the second obtaining sub-module further comprises:

a first preprocessing unit, configured to perform image enhancement preprocessing on first image data obtained from the capturing to obtain second image data;

a second preprocessing unit, configured to perform feature marking preprocessing on the second image data to obtain the corresponding dust image data, wherein the dust image data comprises corresponding dust features.

Optionally, the processing module 202 comprises:

a first calculating sub-module, configured to perform similarity calculation between dust features corresponding to the dust image data and the dust concentration data to determine an overlapping portion between the dust image data and the dust concentration data.

a second calculating sub-module, configured to determine dust feature data in the current area based on the overlapping portion, wherein the dust feature data comprises current concentration, concentration trends, and corresponding early-warning schemes.

Optionally, the apparatus further comprises:

a first training module, configured to acquire a dust feature analysis model to be trained and a training dust sample set, wherein the training dust sample set comprises dust concentration, dust images corresponding to the dust concentration, and dust concentration labels corresponding to the dust images;

a second training module, configured to perform iterative training on the dust feature analysis model to be trained based on the dust concentration, the dust images corresponding to the dust concentration, and the dust concentration labels corresponding to the dust images, and obtain a trained dust feature analysis model upon completion of iterative training.

Optionally, the second training module further comprises:

a first training sub-module, configured to take newly obtained dust images corresponding to the latest dust concentration as latest training samples to replace a current training set;

a second training sub-module, configured to perform iterative training on the dust feature analysis model to be trained through the latest training samples, thereby obtaining the trained dust feature analysis model.

Optionally, the generating module 203 comprises:

a first determining sub-module, configured to determine curve graphs of each feature data in hierarchical feature data based on the dust feature data;

a second determining sub-module, configured to obtain trend graphs of each feature data based on the curve graphs;

a third determining sub-module, configured to generate corresponding early-warning strategies according to the trend graphs and the curve graphs, and generate a visualization report for display.

Figure 3:
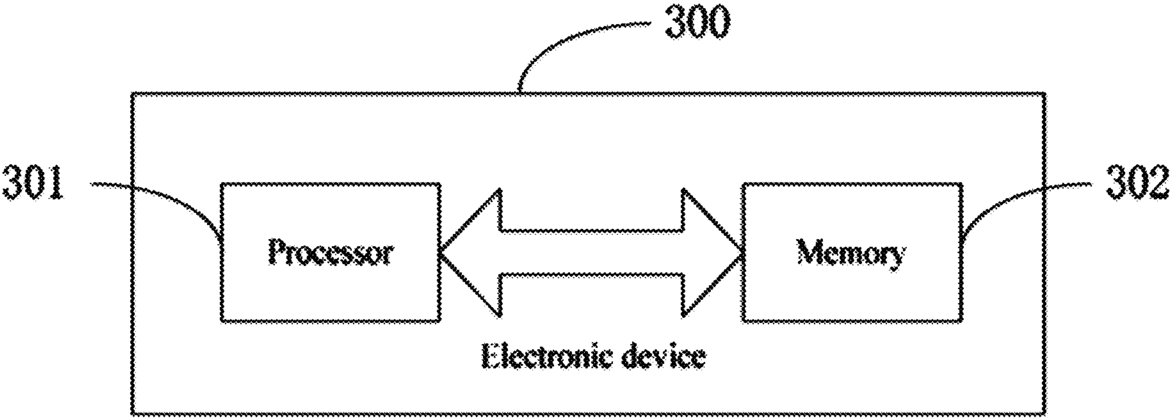
FIG. 3 is a schematic structural diagram of an electronic device provided by an embodiment of the present invention.

As shown in FIG. 3, the embodiment of the present invention further provides an electronic device 300, comprising a processor, wherein the processor may execute any one of the dust detection methods based on image processing described above.

Specifically, the electronic device comprises a processor 301, a memory 302, and a computer program stored in the memory 302 and executable by the processor 301 for implementing the dust detection method based on image processing, wherein:

the processor 301 executes the computer program stored in the memory 302 for the dust detection method based on image processing, performing the following steps:

obtaining dust data in a current area, wherein the dust data comprises dust image data and dust concentration data;

processing the dust image data and the dust concentration data through a trained dust feature analysis model, thereby obtaining dust feature data in the current area; and integrating and outputting the dust feature data through a visualization module to generate a visualized dust feature report.

Optionally, the processor 301 performs the obtaining of dust data in the current area, comprising:

collecting dust in the current area over a preset time period through a preset concentration sensor to obtain corresponding dust concentration data;

capturing images of dust in the current area over a preset time period through a preset optical camera to obtain corresponding dust image data.

Optionally, the processor 301 performs the capturing of images of dust in the current area over a preset time period through the preset optical camera to obtain corresponding dust image data, comprising:

performing image enhancement preprocessing on first image data obtained from the capturing to obtain second image data;

performing feature marking preprocessing on the second image data to obtain the corresponding dust image data, wherein the dust image data comprises corresponding dust features.

Optionally, the processor 301 performs the processing of the dust image data and the dust concentration data through the trained dust feature analysis model to obtain dust feature data in the current area, comprising:

performing similarity calculation between dust features corresponding to the dust image data and the dust concentration data to determine an overlapping portion between the dust image data and the dust concentration data;

determining dust feature data in the current area based on the overlapping portion, wherein the dust feature data comprises current concentration, concentration trends, and corresponding early-warning schemes.

Optionally, before the processor 301 performs the processing of the dust image data and the dust concentration data through the trained dust feature analysis model to obtain dust feature data in the current area, the method further comprises:

obtaining a dust feature analysis model to be trained and a training dust sample set, wherein the training dust sample set comprises dust concentration, dust images corresponding to the dust concentration, and dust concentration labels corresponding to the dust images;

performing iterative training on the dust feature analysis model to be trained based on the dust concentration, the dust images corresponding to the dust concentration, and the dust concentration labels corresponding to the dust images, and obtaining a trained dust feature analysis model upon completion of iterative training.

Optionally, the processor 301 further performs the iterative training on the dust feature analysis model to be trained based on the dust concentration, the dust images corresponding to the dust concentration, and the dust concentration labels corresponding to the dust images, and obtaining a trained dust feature analysis model upon completion of iterative training, wherein the method further comprises:

taking newly obtained dust images corresponding to the latest dust concentration as latest training samples to replace a current training set.

performing iterative training on the dust feature analysis model to be trained through the latest training samples, thereby obtaining the trained dust feature analysis model.

Optionally, the processor 301 further performs the integrating and outputting of the dust feature data through the visualization module to generate a visualized dust feature report, comprising:

determining curve graphs of each feature data in hierarchical feature data based on the dust feature data;

obtaining trend graphs of each feature data based on the curve graphs;

generating corresponding early-warning strategies according to the trend graphs and the curve graphs, and generating a visualization report for display.

The embodiment of the present invention further provides a computer-readable storage medium, having stored thereon a computer program, wherein the computer program, when executed by a processor, implements the dust detection method based on image processing or each process of the dust detection method based on image processing at the application side provided by the embodiments of the present invention, and achieves the same technical effects. To avoid redundancy, detailed descriptions thereof are omitted herein.

It will be understood by those skilled in the art that all or part of the processes in the method of the embodiments described above can be implemented by computer programs instructing relevant hardware, and these programs may be stored in a computer-readable storage medium. When executed, these programs may include processes corresponding to the method embodiments described above. The storage medium may be, for example, a magnetic disk, an optical disc, a read-only memory (ROM), or a random-access memory (RAM).

The embodiments disclosed above are merely preferred embodiments of the present invention and should not be construed as limitations to the scope of the present invention. Therefore, equivalent modifications made in accordance with the claims of the present invention shall still fall within the scope covered by the present invention.

What is claimed is:

1. A dust detection method based on image processing, wherein the method comprises:

obtaining dust data in a current area, wherein the dust data comprises dust image data and dust concentration data;

processing the dust image data and the dust concentration data through a trained dust feature analysis model to obtain dust feature data in the current area; and integrating and outputting the dust feature data through a visualization module to generate a visualized dust feature report, wherein obtaining of the dust data in a current area comprises:

collecting dust in a current area over a preset time period through a preset concentration sensor to obtain corresponding dust concentration data; and capturing images of dust in the current area over a preset time period through a preset optical camera to obtain corresponding dust image data;

wherein capturing images of dust in the current area over a preset time period through a preset optical camera to obtain corresponding dust image data comprises:

performing image enhancement preprocessing on captured first image data to obtain second image data; and performing feature marking preprocessing on the second image data to obtain the corresponding dust image data, wherein the dust image data comprises corresponding dust features, wherein processing of the dust image data and the dust concentration data through a trained dust feature analysis model to obtain dust feature data in the current area comprises:

performing similarity calculation between the dust concentration data and dust features corresponding to the dust image data to determine an overlapping portion between the dust image data and the dust concentration data; and determining dust feature data in the current area based on the overlapping portion, wherein the dust feature data comprises current concentration, concentration trends, and corresponding early-warning schemes.

2. The dust detection method based on image processing according to claim 1, wherein before processing of the dust image data and the dust concentration data through a trained dust feature analysis model to obtain dust feature data in the current area, the method further comprises:

obtaining a dust feature analysis model to be trained and a training dust sample set, wherein the training dust sample set comprises dust concentration, dust images corresponding to the dust concentration, and dust concentration labels corresponding to the dust images; and performing iterative training on the dust feature analysis model to be trained based on the dust concentration, the dust images corresponding to the dust concentration, and the dust concentration labels corresponding to the dust images, to obtain the trained dust feature analysis model upon completion of iterative training.

3. The dust detection method based on image processing according to claim 2, wherein the performing iterative training on the dust feature analysis model to be trained based on the dust concentration, the dust images corresponding to the dust concentration, and the dust concentration labels corresponding to the dust images, to obtain the trained dust feature analysis model upon completion of iterative training, comprises:

taking newly obtained dust images corresponding to the latest dust concentration as latest training samples to replace a current training set; and performing iterative training on the dust feature analysis model to be trained through the latest training samples to obtain the trained dust feature analysis model.

4. The dust detection method based on image processing according to claim 1, wherein integrating and outputting the dust feature data through a visualization module to generate a visualized dust feature report comprises:

determining curve graphs of each feature data in hierarchical feature data based on the dust feature data;

obtaining trend graphs of each feature data based on the curve graphs; and generating corresponding early-warning strategies according to the trend graphs and the curve graphs, and generating a visualization report for display.

5. A dust detection apparatus based on image processing, wherein the apparatus comprises:

a preset optical camera, configured to capture images of dust in a current area over a preset time period to obtain dust image data;

a preset concentration sensor, configured to collect dust in the current area over a preset time period to obtain dust concentration data;

a processor, configured to process the dust image data and the dust concentration data through a trained dust feature analysis model to obtain dust feature data in the current area; and a smart terminal, configured to integrate and output the dust feature data to generate a visualized dust feature report, the preset optical camera is configured specifically to perform image enhancement preprocessing on first image data obtained from the capturing to obtain second image data, and to perform feature marking preprocessing on the second image data to obtain the corresponding dust image data, wherein the dust image data comprises corresponding dust features, wherein the processor comprises:

a first sub-processor, configured to perform similarity calculation between dust features corresponding to the dust image data and the dust concentration data to determine an overlapping portion between the dust image data and the dust concentration data;

a second sub-processor, configured to determine dust feature data in the current area based on the overlapping portion, wherein the dust feature data comprises current concentration, concentration trends, and corresponding early-warning schemes.

6. The dust detection apparatus based on image processing according to claim 5, wherein the processor is further configured to acquire a dust feature analysis model to be trained and a training dust sample set, wherein the training dust sample set comprises dust concentration, dust images corresponding to the dust concentration, and dust concentration labels corresponding to the dust images;

the processor, is further configured to perform iterative training on the dust feature analysis model to be trained based on the dust concentration, the dust images corresponding to the dust concentration, and the dust concentration labels corresponding to the dust images, and obtain a trained dust feature analysis model upon completion of iterative training.

7. The dust detection apparatus based on image processing according to claim 6, the processor is specifically configured to take newly obtained dust images corresponding to the latest dust concentration as latest training samples to replace a current training set, and to perform iterative training on the dust feature analysis model to be trained through the latest training samples, thereby obtaining the trained dust feature analysis model.

8. The dust detection apparatus based on image processing according to claim 5, wherein the smart terminal is specifically configured to determine curve graphs of each feature data in hierarchical feature data based on the dust feature data, to obtain trend graphs of each feature data based on the curve graphs, and to generate corresponding early-warning strategies according to the trend graphs and the curve graphs, and generate a visualization report for display.

9. An electronic device, wherein the device comprises:

a memory, a processor, and a computer program stored in the memory and executable by the processor, wherein when executing the computer program, the processor implements the steps in the dust detection method based on image processing according to claim 1.

* * * * *